United States Patent [19]
Cannady, Jr.

[11] Patent Number: 5,676,090
[45] Date of Patent: Oct. 14, 1997

[54] SCATTER-RESISTANT LITTER BOX

[76] Inventor: Earl W. Cannady, Jr., 11490 Amberridge Ct., Moorpark, Calif. 93021

[21] Appl. No.: 606,076

[22] Filed: Feb. 23, 1996

[51] Int. Cl.[6] ............................................. A01K 29/00
[52] U.S. Cl. ............................................................. 119/165
[58] Field of Search ................................. 119/165, 167, 119/168, 169, 170

[56] References Cited

U.S. PATENT DOCUMENTS

| | | | |
|---|---|---|---|
| 4,766,845 | 8/1988 | Bavas | 119/165 |
| 5,031,578 | 7/1991 | Hammonds et al. | 119/167 |
| 5,058,528 | 10/1991 | Counseller et al. | 119/165 |
| 5,094,188 | 3/1992 | Wolak | 119/168 |
| 5,178,100 | 1/1993 | Monk | 119/168 |
| 5,184,574 | 2/1993 | Kirk et al. | 119/162 |
| 5,220,886 | 6/1993 | Hyde | 119/165 |
| 5,329,879 | 7/1994 | Walton | 119/166 |
| 5,361,725 | 11/1994 | Baillie et al. | 119/165 |
| 5,388,550 | 2/1995 | Noble | 119/165 |

*Primary Examiner*—Thomas Price

[57] ABSTRACT

There is disclosed herein a scatter-resistant litter and waste collection system which includes a base and a tap support skeleton defining an interior space configured to receive refuse and to collect the excess litter from the animal's paws. The scatter-resistant litter and waste collection system may be advantageously configured to provide a litter box for felines and the like.

3 Claims, 4 Drawing Sheets

SCATTER-RESISTANT LITTER BOX

BACKGROUND-FIELD OF INVENTION

This invention relates generally to containers for the collection of refuse, more particularly, the invention relates to a litter box for small animals, and most specifically, the present invention relates to a litter collection system for felines and the like, which reduces the scatter and tracking of litter outside a litter box.

BACKGROUND-DESCRIPTION OF PRIOR ART

As society has become increasingly urban, cats are spending more time in houses and apartments. Cats, although good in personal grooming, are horrid at keeping their living quarters clean. This causes pet owners to become frustrated with the sloppy house keeping of their animals and forces them to expend a great deal of time cleaning up after their pets.

It has become common for cat owners to provide their pets with a litter box, typically a shallow tray filled with sand or one of the various commercially available absorbant materials. The cat litter box, while containing most of the litter and waste, often is surrounded by waste and litter that has temporarily adhered to the cat's paws and is deposited outside the box, on the owner's floor, carpet and furniture. It is not uncommon for the expulsion of litter from the cat's paws to occur up to ten feet from the litter box. If not continuously removed from the floor or carpet, the litter is tracked by humans and animals much farther from the box.

Accordingly, it can be seen that there is a need for a cat litter system which will reduce the amount of litter that is tracked outside of the litter box. Although, many inventors approached this issue, none of them viewed it from the cat's point of view. If a cat has litter stuck between it's paws, the litter will stay there until the cat steps out of the box and walks on a clean surface. At this time the cat's paws expel the litter all over the floor or carpet.

Several types of litter boxes have been proposed-far example, in U.S. Pat. No. 5,329,879 to Walton (1994) discloses a litter box with V shaped valleys inverted with fencing around it to enclose the litter, however, the complexity of the litter box makes it expensive to manufacture and difficult to clean. U.S. Pat. No. 5,094,188 to Wolak (1992) discloses a litter box with an area dedicated to catching the scatter outside the litter box, however, the area is limited and cannot sufficiently catch the majorily of excess litter coming out of the box.

Many other litter boxes have been proposed-for example, in U.S. Pat. No. 5,184,574 to Kirk (1993), U.S. Pat. No. 5,178,100 to Monk (1993), U.S. Pat. No. 5,058,528 to Rinard (1991), U.S. Pat. No. 5,031,578 to Hamilton (1991). All of these litter boxes address cat urine drainage, disposable litter box, easy maintenance, odor of litter box but none of these or any other litter box designers have truly addressed the issue of litter scatter and tracking outside the box.

All the litter boxes heretofore known suffer from a number of disadvantages:

(a) They do not sufficiently reduce the amount of litter scatter and tracking outside the litter box.
(b) Because of the excess scatter outside the litter box they provide a dirty environment for the pet and its owner.
(c) They do not provide a dedicated area to collect the majority of the litter trapped in the pet's paws.
(d) They rely on the consumer to purchase expensive clumping litter to, somewhat, reduce the scatter.
(e) They do not wipe the pet's paws or attempt to remove the litter from pet's paws.

BRIEF DESCRIPTION OF THE INVENTION

There is disclosed herein a refuse container comprising a skeleton defining an interior space configured to receive refuse. The container further comprises an area where refuse is removed from the animal's paws and is collected inside the container. In particular embodiments, the support skeleton is configured as a box-like member having a bottom or base, and top which, when connected, partially enclose a refuse containing space.

In a particular embodiment, the refuse container is structured as a litter box for felines and the like. The embodiment is comprised of a box-like support skeleton which includes a base which consists of a wall member encircling the periphery of a planar floor so as to define an interior space. The litter box further comprises a top which consists of a generally planar lid and a wall member encircling the periphery of the lid in a non-coplanar relationship therewith so as to define an interior space. When joined, the top and base define an enclosed volume. The interior volume is separated into two chambers: one for expulsion of waste, the other for removal of refuse from the animal's paws. One of the walls also includes an opening there through communicating with the interior space.

In yet other embodiments, the lid is generally rectangular and the wall member includes four walls which align with four edges of the lid. Three of the walls are deposed at approximately right angels to the lid and a fourth is disposed at an obtuse angel to the lid. The fourth wall constitutes at least a position of the definition of the interior space.

In further refinements of the present invention, the litter box incorporates an odor-resistant filter. The lid has a second opening therein. The filter is disposed so as to occlude at least a portion of that opening.

OBJECTS AND ADVANTAGES

Accordingly, several objects and advantages of my invention are:

(a) to provide a litter box which can reduce excess litter from spilling onto the floor outside the litter box;
(b) to provide a litter box which removes litter from the pet's paws before they exit the litter box;
(c) to provide a dedicated area to collect much of the excess litter from the pet's paws, reducing scatter;
(d) to provide a cleaner environment for the pet;
(e) to provide a cleaner environment for the pet owner;
(f) to provide a litter box that reduces scatter and works with all types of pet litter;
(g) to provide an economical solution to litter box scatter.

Further objects and advantages are that it provides a litter box which is inexpensive to manufacture, easy to clean, not too large, and not too complicated for the pet to use.

REFERENCE NUMERALS IN DRAWINGS

| 10 | litter box | 42 | lip around opening | 65 | floor | 82 | lid |
| --- | --- | --- | --- | --- | --- | --- | --- |
| 12 | lid opening | 50 | litter removal area | 74 | long side wall of base | 84 | trapezoid side wall of top |
| 20 | top | 51 | ramp-like structure | 76 | long side wall of base | 86 | trapezoid side wall of top |
| 30 | base | 52 | carpet-like material | 70 | rear wall of base | 88 | rear wall of top |
| 40 | opening | 60 | litter well | 72 | front wall of base | 89 | front wall of top |

DETAILED DESCRIPTION OF THE INVENTION

In its most basic form, the invention includes a litter box assembly composed of a base and a top. The base is a self-supporting polyhedral shape which defines an interior space that is divided by a wall into two interior compartments. The first compartment is for holding the litter. The second compartment has a ramp, covered with a carpet-like material, situated between the inner wall and the front wall to collect excess litter off the cat's paws when exiting the litter box. The top is a polyhedral shape that includes an opening configured to permit passage of the pet.

Figure 1:
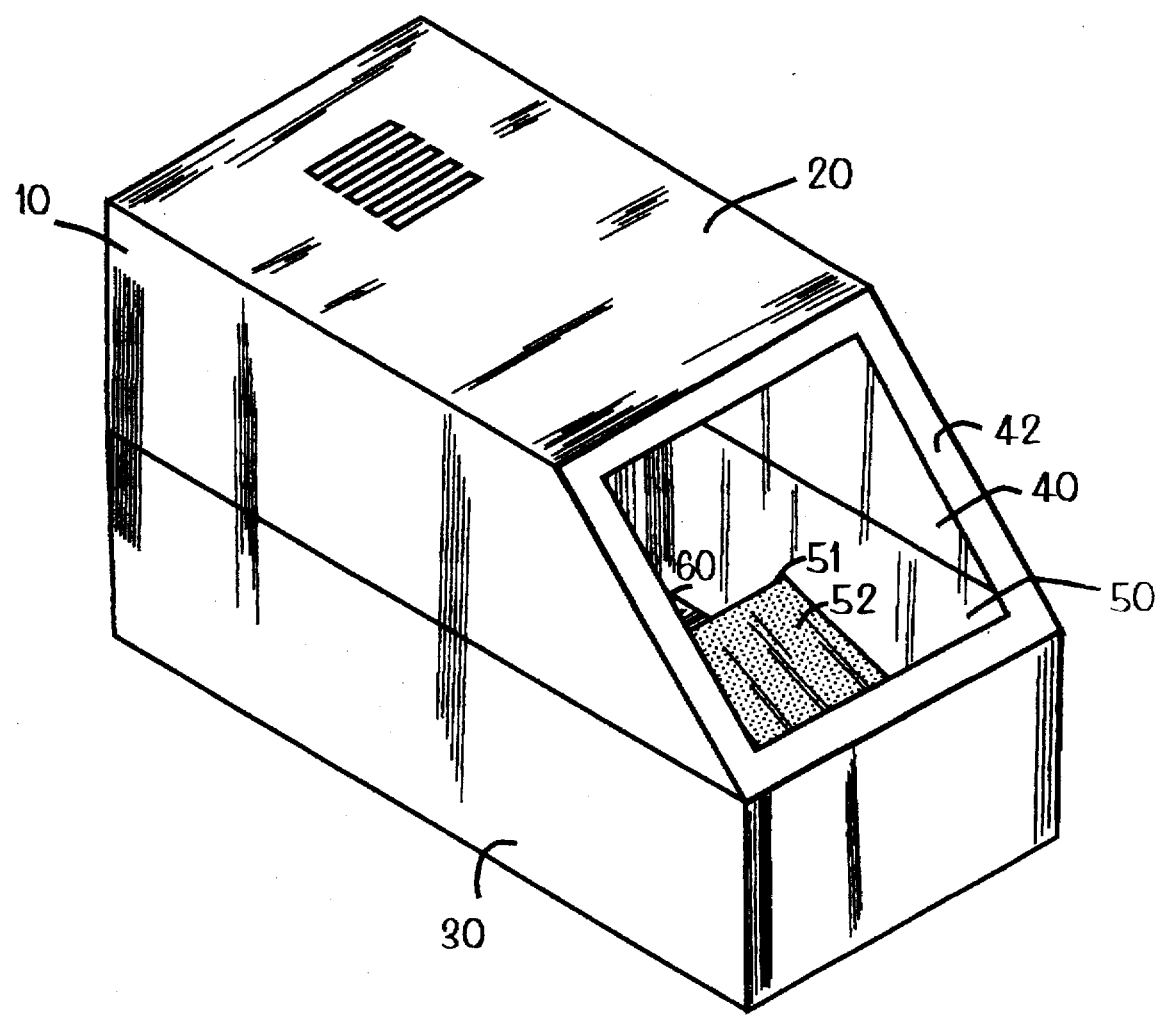
FIG. 1 is a perspective view of the invention in its closed state.

Referring now to FIG. 1 there is shown a litter box 10 structured, in its closed state, in accord with the principles of the present invention. The litter box 10 includes a base 30 with a litter removal area 50 structured in the upper portion of the base towards the opening 40. The litter removal area 50 contains a ramp-like structure 51 which is covered with a removable carpet-like material 52. The base 30 includes a litter well 60 in the rear portion for storage of the litter to be used by the cat. The litter box includes a top 20 with an opening 40 to permit passage of the cat. In the illustrated embodiment the opening 40 in the top 20 is made so as to leave a lip 42 around the opening to provide screening of the interior of the litter box. It has been found that cats generally prefer the privacy afforded by such screening of the interior of the litter box. Also the lip 42 prevents the cat from jumping out over the litter removal area 50, which collects the excess litter from their paws.

Figure 2A:
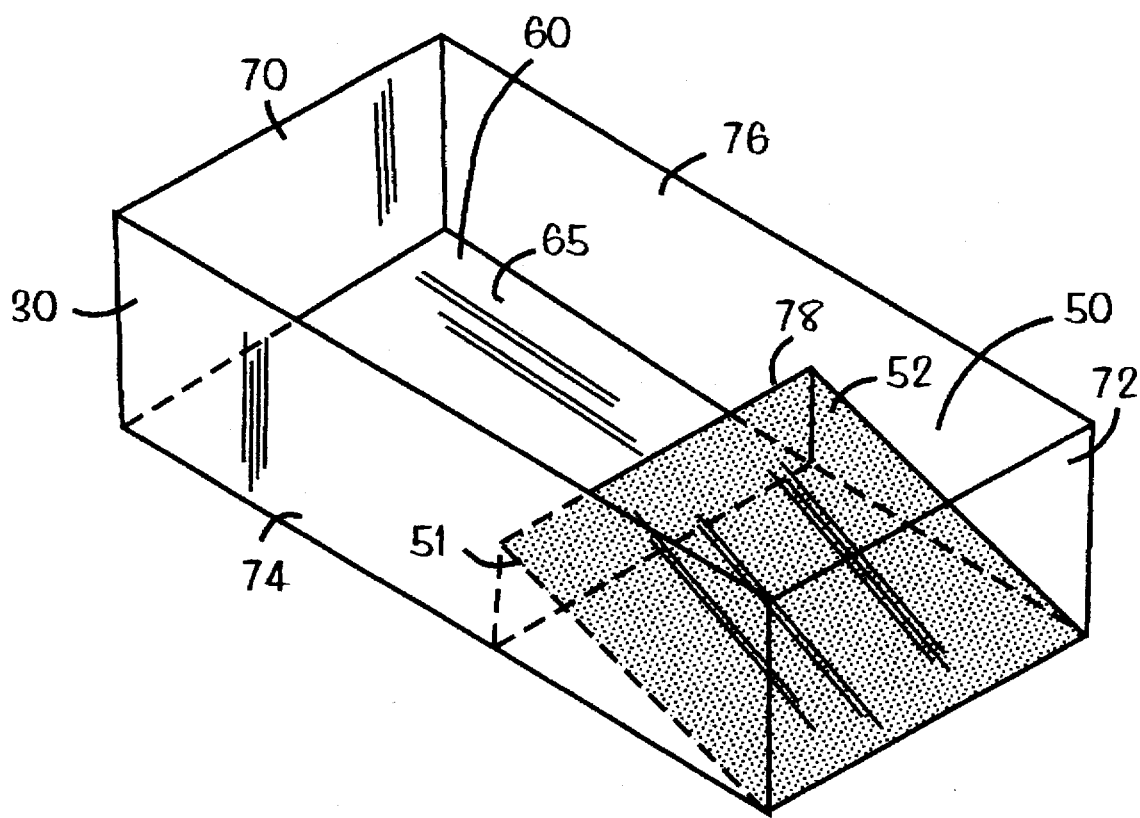
FIG. 2A is a perspective transparent view of the base of the invention.

Referring now to FIG. 2A there is shown a perspective transparent view of the base 30 structured in accord with the principles of the present invention. The base 30 of FIG. 2A is configured as a polyhedral shape. The base 30 of FIG. 2A includes a floor 65, which is generally rectangular in shape, and is surrounded by a wall member comprised of four generally planar walls 70,72,74,76. Walls 70 and 72 are relatively narrow walls whereas walls 74 and 76 are relatively long walls and the overall shape of the skeleton is that of a rectangular open box. Inside the base of FIG. 2A is an inner wall 78 which divides the interior space into two compartments, a litter well 60 and a litter removal area 50.

Figure 2B:
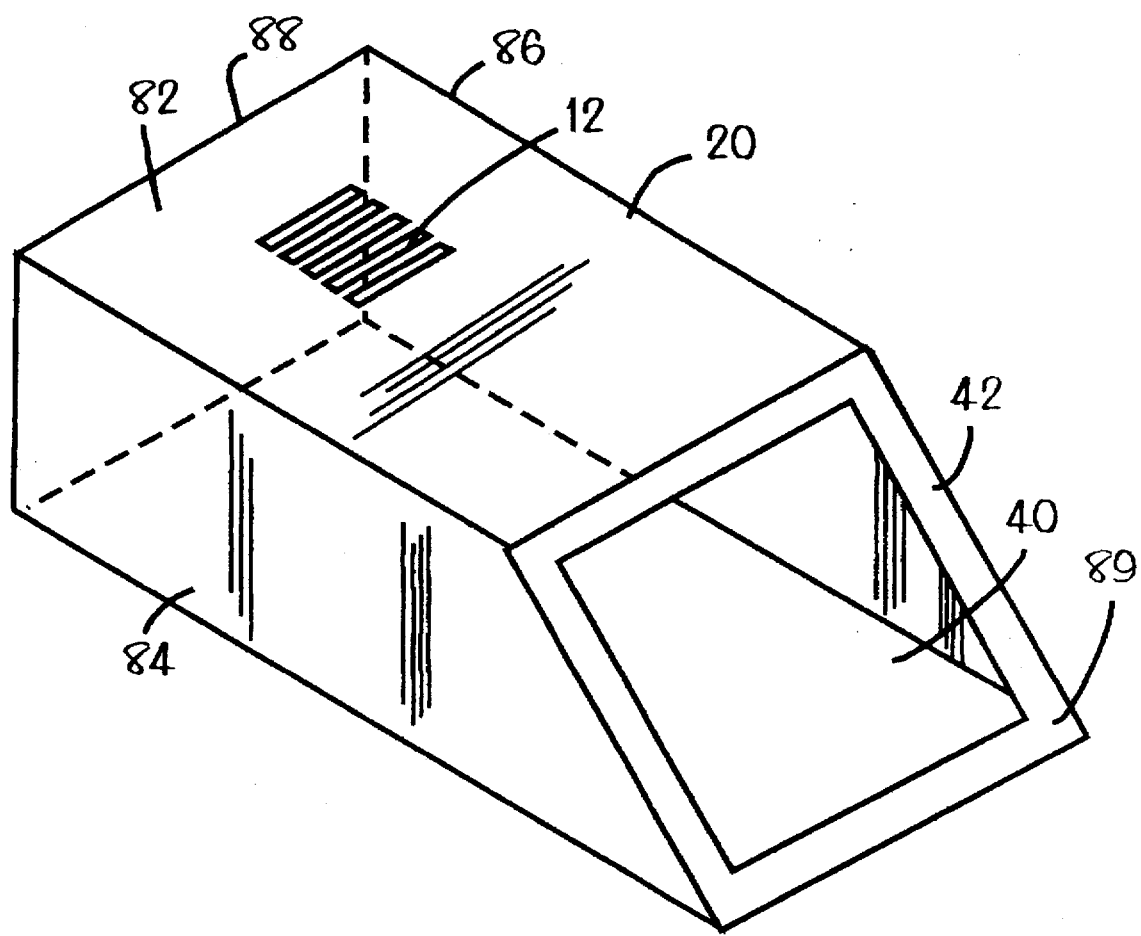
FIG. 2B is a perspective transparent view of the top of the invention.

Referring now to FIG. 2B there is shown a perspective transparent view of the top 20 structured in accord with the principles of the present invention. The top 20 of FIG. 2B is configured as a polyhedral shape having similar rigidity to the base 30 of FIG. 2A. The top 20, shown in FIG. 2B, includes a lid 82, and a wall member surrounding the lid 82 in a non-planar relationship. In this embodiment, the lid is rectangular in shape and is surrounded by a wall member comprised of four generally planar walls 84,86,88,89. Walls 88 and 89 are generally narrow walls whereas walls 84 and 86 are relatively long walls. In this particular embodiment, walls 84 and 86 are trapezoidal in shape. The overall shape of the top 20 is that of a box. Wall 89 has an opening 40 which, in this particular embodiment, leaves a lip 42 as the remaining part of wall 89 coextensive with the lid 82 and the angled edges of walls 84 and 86. The lid 82 of FIG. 2B is provided with a lid opening 12 disposed in the top 20 thereof. This lid opening 12 is closed with an appropriate filter material. The filter may be fabricated as a bactericidal or fungicidal impregnated material and may include carbon in the form of activated charcoal, bone black or the like for odor removal. The lid opening 12, in combination with the door opening 40, creates a draft; air passes into the door opening 40 and exits through the lid opening 12 drawing odors therewith. Obviously, the lid opening 12 may be placed other than at the top of the lid 82.

Figure 3:
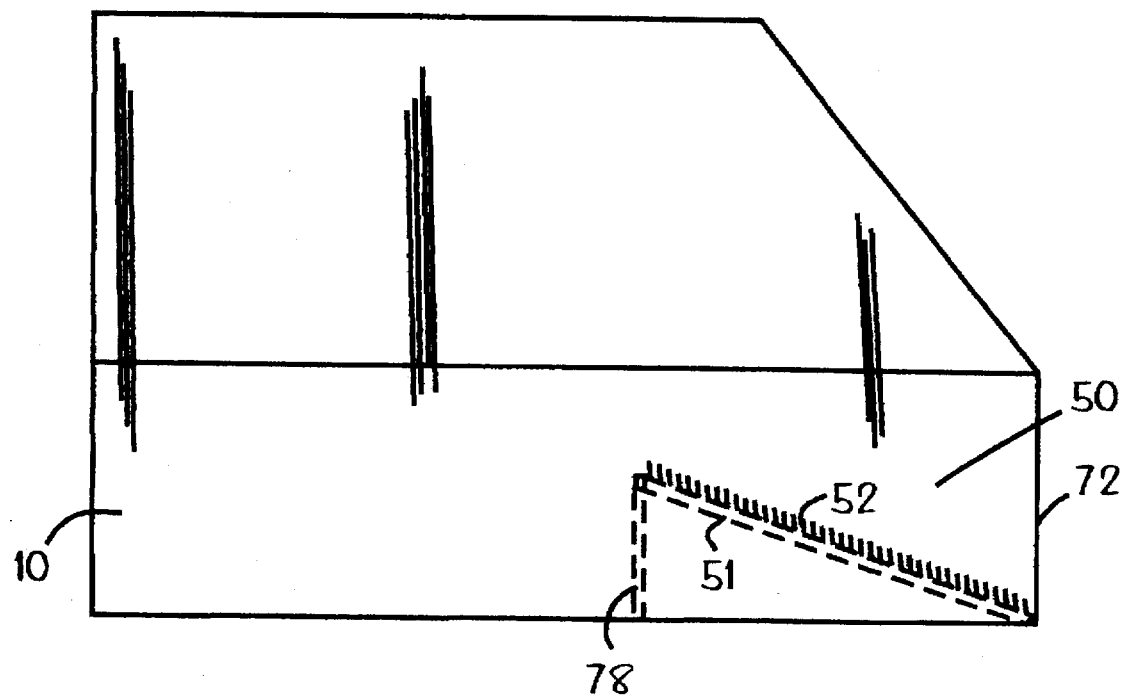
FIG. 3 is a side transparent view of the invention in its closed state.

Referring now to FIG. 3 there is shown a transparent side view of the litter box 10 in its closed state. The ramp-like structure 51 is generally rectangular and is supported by the inner wall 78 of FIG. 3 and it is covered with a removable carpet-like material 52 in which to collect the litter off the cat's paws. It has been found that after using the box, before exiting, the cat is forced to step on the ramp-like structure 51 expelling excess litter from its paws, since the high threshold of the ramp-like structure 51 will induce the cat to move forward stepping on the ramp-like structure 51 with all four paws. As shown in this embodiment, the ramp-like structure 51 slants downward toward the front wall 72. In other embodiments, the ramp-like structure could slant upward toward the front wall 72 or be replaced by a different structure that forces the cat to wipe its paws. In this embodiment, the ramp-like structure 51 consumes the entire volume of the litter removal area 50. In other embodiments floor area could precede or follow the beginning and/or ending of the ramp-like structure.

Problems associated with cats spreading excess litter out of a litter box are not particular to the present invention. In general, an enclosed or open litter box will allow litter to get stuck between the cat's paws and thereby spread litter outside of the litter box. The present invention recognizes this problem and solves it by creating a built-in trap to remove the litter from the cats paws before the cat exits the litter box.

Referring back to FIG. 2A the base 30, in this embodiment, is approximately 8"×14"×28". The inner wall 78 is approximately 8"×14" and is connected to the base at a 90 degree angle. The ramp-like structure 51 is approximately 14"×12.5" and it is connected to the top of the inner wall forming an approximate 30 degree angle.

Referring back to FIG. 2B the top 20, in this embodiment, is a polyhedral shape. The lid 82 is approximately 14"×20" rectangular with a back wall 88 which is approximately 8"×14". The two side walls 84 and 86 are trapezoids. The top edges of these trapezoids being approximately 20" long, the rear sides being approximately 8" tall, the bottom sides being approximately 28" long, and the front edges being approximately 10" joining the long bottom edge with the short top edge. The top 20 in this embodiment has a lid opening 12 which is composed of approximately 5 rectangular holes 0.5"×4" on the lid 82. The door opening 40 has a lip 42 surrounding all four sides approximately 2" all the way around.

There are a wide variety of materials which may be employed to fabricate the litter box 10 of FIG. 1. It has been found most expedient to fabricate this member from molded flexible plastic or other easily manufacturable substance roughly 0.12 to 0.25 inches thick.

Referring back to FIG. 1, the present invention is simple to manufacture and is an easy to use cat litter box system which eliminates the hazard and unsightly appearance of cat litter material outside the litter box. The litter box 10 represents a rugged, moisture impervious, enclosure to the cat which eliminates hazards of spilled litter outside the litter box. The excess litter collected on the ramp-like structure 51 is easily cleaned by simply pulling up the carpet-like material 52 and shaking off the excess litter into the liter well 60 or disposing of it by other means.

It is to be appreciated that while the foregoing has been described primarily with reference to a litter box for cats, obviously, the invention is not so limited. There are a number of domesticated and semidomesticated animals kept as pets, which can be trained to use a litter box. Including therein skunks, ferrets, pigs and raccoons.

In light of the foregoing, it will be apparent that there are many modifications and variations of the present invention which will be obvious to one of skill in the art. Accordingly, the foregoing drawings, discussion, description and examples are merely meant to illustrate particular embodiments of the invention and are not meant to be limitations upon the practice thereof. It is the following claims, including all equivalents, which define the scope of the invention.

I claim:

1. A scatter-resistant litter containment system for felines and the like comprising:

a base container, said base container having a rectangular base, a front wall, a rear wall, side walls, an inner wall, said inner wall separating the base container into two generally equal areas and a ramp, said ramp sloping downwardly outward from the top edge of the inner wall to the bottom edge of the front wall with enough strength to support the animal's weight;

a lid container, said lid container having a rectangular top, a rear wall, side walls and a front wall, said front wall having an opening therethrough.

2. A scatter-resistant litter containment system as described in claim 1 wherein the sizes and positions of the said lid container, inner wall of said base container and opening in the front wall of said lid container force the animal to walk on the ramp of said base container while exiting the box.

3. A scatter-resistant litter containment system as described in claim 2 wherein the ramp of said base container further comprises a removable and reusable paw cleaner coupled thereto.

* * * * *